United States Patent
Raita et al.

(10) Patent No.: US 9,007,385 B2
(45) Date of Patent: Apr. 14, 2015

(54) IMAGE PROCESSING APPARATUS

(71) Applicant: Panasonic Corporation, Osaka (JP)

(72) Inventors: Kazuhisa Raita, Kyoto (JP); Takeshi Endo, Kanagawa (JP); Kiyoshi Notsu, Kanagawa (JP); Satoshi Fujii, Kanagawa (JP); Hiroto Koshimizu, Kanagawa (JP); Tomohiro Watanabe, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/172,624

(22) Filed: Feb. 4, 2014

(65) Prior Publication Data

US 2014/0152679 A1    Jun. 5, 2014

Related U.S. Application Data

(63) Continuation of application No. PCT/JP2012/004963, filed on Aug. 3, 2012.

(30) Foreign Application Priority Data

Aug. 5, 2011   (JP) ................................ 2011-172001

(51) Int. Cl.
*G06T 1/00*    (2006.01)
*G06T 15/00*   (2011.01)
*G06F 1/00*    (2006.01)
(Continued)

(52) U.S. Cl.
CPC ............... *G06F 11/327* (2013.01); *G08G 1/16* (2013.01); *G06T 1/00* (2013.01); *G06F 11/00* (2013.01)

(58) Field of Classification Search
CPC ........ G06T 1/00–1/0092; G06T 15/00–15/005; G06F 15/00
USPC .................................................. 345/501, 522
See application file for complete search history.

(56) References Cited

U.S. PATENT DOCUMENTS

| 5,360,077 A | 11/1994 | Nishimoto et al. | |
| 2008/0174517 A1* | 7/2008 | Bigot et al. | 345/1.3 |

(Continued)

FOREIGN PATENT DOCUMENTS

| JP | 02-039398 A | 2/1990 |
| JP | 05-081222 A | 4/1993 |

(Continued)

OTHER PUBLICATIONS

International Search Report issued in International Application No. PCT/JP2012/004963 mailed Oct. 30, 2012, with English translation.

*Primary Examiner* — Jacinta M Crawford
(74) *Attorney, Agent, or Firm* — McDermott Will & Emery LLP (57) ABSTRACT

An image processing apparatus has a main processing section that outputs an image processing command signal; an anomaly detection section that detects an anomaly in the main processing section, outputting an anomaly information output signal; an image processing section that outputs a first image signal when the main processing section is in normal operation and that outputs a second image signal when an anomaly has occurred in the main processing section; and an image selection section that selects either the first image signal or the second image signal on the basis of the anomaly information output section.

13 Claims, 7 Drawing Sheets

(51) Int. Cl.
  *G06F 11/32* (2006.01)
  *G06F 11/00* (2006.01)
  *G08G 1/16* (2006.01)

(56) References Cited

U.S. PATENT DOCUMENTS

2010/0083043 A1* 4/2010 Niioka .......................... 714/23

2010/0220781 A1* 9/2010 Ikeuchi et al. ........... 375/240.02

FOREIGN PATENT DOCUMENTS

| JP | 5-094056 U | 12/1993 |
| JP | 06-059842 A | 3/1994 |
| JP | 7-026796 Y2 | 6/1995 |
| JP | 2010-146135 A | 7/2010 |
| JP | 2010-214932 A | 9/2010 |

* cited by examiner

IMAGE PROCESSING APPARATUS

BACKGROUND

The invention relates to an image processing apparatus that, when an anomaly has arisen, sends a notice to this effect.

A recent vehicle displays details of electronic control on a display unit after subjecting the details to image processing. Since a driver performs driving while believing in the details displayed on the display unit, malfunction of image processing is not desirable at all in view of enhancement of vehicle safety.

An anti-disaster monitoring apparatus described in connection with Patent Document 1 switches terminal equipment connected to a main control section to a sub-control section by changeover means when an anomaly monitoring means has detected an anomaly in the main control section, transmitting anti-disaster information to a receiver by use of a sub-transmission line. It is thus possible to provide a highly-reliable distributed anti-disaster monitoring apparatus capable of adequately addressing a situation without deteriorating information transmission capability, which would otherwise be caused by a fault.

RELATED ART DOCUMENTS

Patent Documents

Patent Document 1: JP-A-2-39398
Patent Document 2: JP-A-2010-146135
Patent Document 3: JP-U-5-94056
Patent Document 4: JP-A-5-81222

The above-described example is directed toward a configuration that makes up a so-called backup from two means; namely, main means and sub-means. Normal control is not performed in a period during which switching from the main control section to the sub-control section takes place after detection of an anomaly in the main control section. Therefore, even when a similar backup system for image processing means is laid in the vehicle, correct information is not displayed on the display unit before switching from a main image processing section to a sub-image processing section takes place. As a consequence, the driver cannot become aware of occurrence of the anomaly. Granting that a transition time is short, there is a possibility that a lag in momentary judgment will lead to a serious situation depending on a traveling status of the vehicle. For this reason, in the event of occurrence of an anomaly, a driver must be promptly informed of the anomaly.

SUMMARY

The invention aims at providing an image processing apparatus that, when an anomaly has occurred, can immediately send a notice to this effect.

According to one aspect of the invention, there is provided an image processing apparatus comprising:
 a main processing section configured to output an image processing command signal;
 an anomaly detection section configured to detect an anomaly in the main processing section on the basis of the image processing command signal and output an anomaly information output signal which shows whether or not the main processing section is anomalous; and
 an image processing section configured to
  take the anomaly information output signal and the image processing command signal as input signals,
  perform image processing on the basis of information of the image processing command signal when the anomaly information output signal represents that the anomaly detection section has not detected an anomaly, and
  perform image processing independent of the image processing command signal when the anomaly information output signal represents that the anomaly detection section has detected an anomaly.

According to another aspect of the invention, there is provided an image processing apparatus comprising:
 a main processing section configured to output a watchdog signal and an image processing command signal;
 an anomaly detection section configured to detect an anomaly in the main processing section on the basis of the watchdog signal, outputting an anomaly information output signal which shows whether or not the main processing section is anomalous; and
 an image processing section configured to
  take the anomaly information output signal and the image processing command signal as input signals,
  perform image processing on the basis of information of the image processing command signal when the anomaly information output signal represents that the anomaly detection section has not detected an anomaly, and
  perform image processing independent of the image processing command signal when the anomaly information output signal represents that the anomaly detection section has detected an anomaly.

In the above image processing apparatus, the anomaly detection section may detect an anomaly in the main processing section on the basis of the watchdog signal and the image processing command signal.

According to still another aspect of the invention, there is provided an image processing apparatus comprising:
 a main processing section configured to output an image processing command signal;
 an anomaly detection section configured to detect an anomaly in the main processing section on the basis of the image processing command signal, outputting an anomaly information output signal which represents whether or not the main processing section is anomalous;
 an image processing section configured to output in parallel a first image signal which is acquired by performing image processing on the basis of the image processing command and a second image signal independent of the image processing command signal; and
 an image selection section configured to select, on the basis of information represented by the anomaly information output section, any one of the first image signal and the second image signal input from the image processing section, outputting the selected signal, wherein
 the image selection section selects the first image signal when the anomaly information output signal shows that the anomaly detection section has not detected an anomaly and selects the second image signal when the anomaly information output signal shows that the anomaly detection section has detected an anomaly.

According to still another aspect of the invention, there is provided an image processing apparatus comprising:
 a main processing section configured to output a watchdog signal showing an operating status and an image processing command signal;
 an anomaly detection section configured to detect an anomaly in a main processing section on the basis of the watchdog signal, outputting an anomaly information output signal which shows whether or not the main processing section is anomalous;

an image processing section configured to output in parallel a first image signal which is acquired by performing image processing on the basis of the image processing command and a second image signal independent of the image processing command signal; and an image selection section configured to select, on the basis of information represented by the anomaly information output section, any one of the first image signal and the second image signal input from the image processing section, outputting the selected signal, wherein the image selection section selects the first image signal when the anomaly information output signal shows that the anomaly detection section has not detected an anomaly and selects the second image signal when the anomaly information output signal shows that the anomaly detection section has detected an anomaly.

In the above image processing apparatus, the anomaly detection section may detect an anomaly in the main processing section on the basis of the watchdog signal and the image processing command signal.

In the above image processing apparatus, the image processing section may periodically output a monitor input signal when in normal operation;

the image processing apparatus may have a watchdog section configured to determine occurrence of an anomaly in the image processing section on the basis of whether or not the monitor input signal is input, outputting a signal showing a determination result;

the anomaly detection section may detect an anomaly in the image processing section on the basis of a signal output from the watchdog section, outputting an alarm image signal; and the image selection section may output the alarm image signal when the alarm image signal is input.

In the above image processing apparatus, a displayed image provided by the second image signal may be a white image, a black image, an image showing an alarm display, or an image showing malfunction of the image processing apparatus.

The above image processing apparatus may further comprise memory configured to store the image processing command signal and the anomaly information output signal in an associated manner.

The above image processing apparatus may further comprise memory configured to store a signal output from the watchdog section and the alarm image signal in an associated manner.

The above image processing apparatus may further comprise a sound processing section configured to perform processing so as to output sounds conforming to the anomaly information output signal output from the anomaly detection section.

When an anomaly has arisen, an image processing apparatus of the invention can immediately give a notice to this effect.

DETAILED DESCRIPTION OF EMBODIMENTS

Embodiments of the invention are hereunder described by reference to the drawings.

First Embodiment

Figure 1:
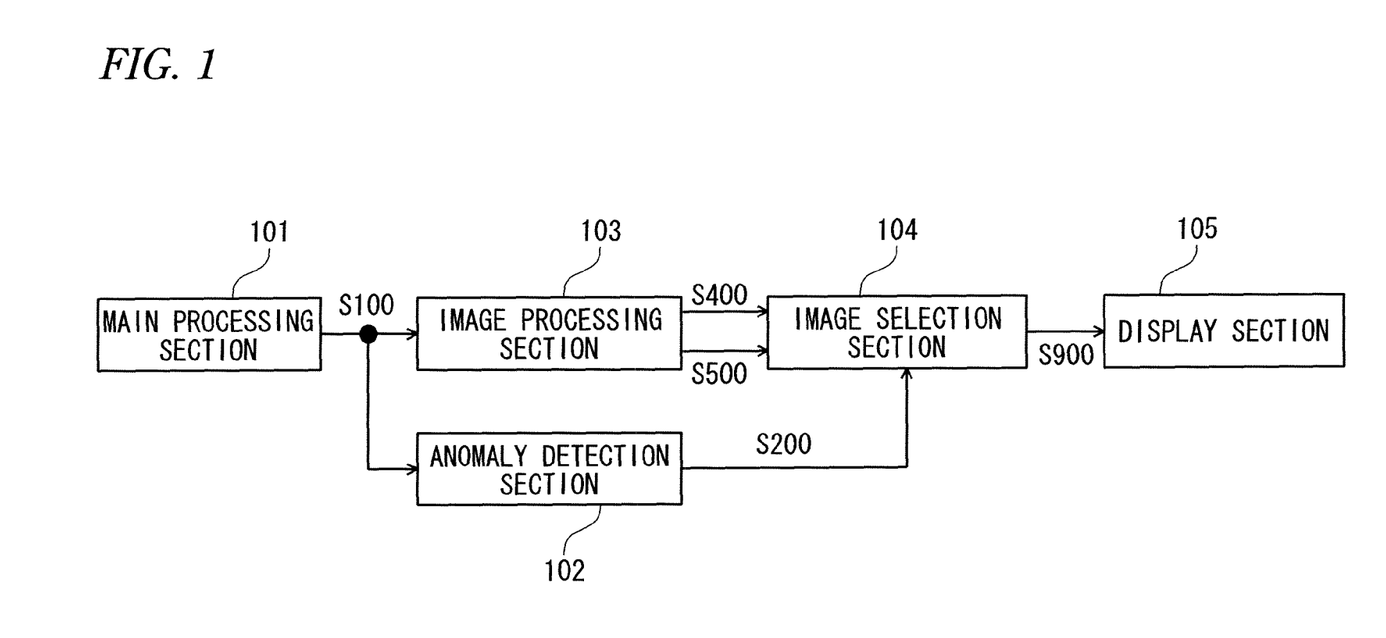
FIG. 1 is a block diagram showing an image processing apparatus of a first embodiment.

FIG. 1 is a block diagram showing an image processing apparatus of a first embodiment. As shown in FIG. 1, the image processing apparatus of the first embodiment comprises a main processing section 101, an anomaly detection section 102, an image processing section 103, an image selection section 104, and a display section 105.

The main processing section 101 outputs an image processing command signal S100. The image processing command signal S100 is a control signal for an image processing section 103 and input to the anomaly detection section 102 and the image processing section 103. The anomaly detection section 102 detects an anomaly in the main processing section 101 on the basis of the image processing command signal S100. The anomaly detection section 102 outputs an anomaly information output signal S200 that represents whether or not the main processing section 101 is anomalous. The anomaly information output signal S200 is input to the image selection section 104.

The image processing section 103 performs image processing conforming to the image processing command signal S100, outputting in parallel an image-processed image signal S400 and a point-of-occurrence-of-anomaly image signal S500 regardless of whether or not the main processing section 101 is anomalous. The image-processed image signal S400 is one which is acquired as a result of image processing being performed in accordance with the image processing command signal S100. In the meantime, the point-of-occurrence-of-anomaly image signal S500 is also one which is acquired as a result of image processing being performed independently of the image processing command signal S100 and regardless of whether or not the main processing section is anomalous. To be specific, the image signals S400 and S500 are independent of each other. The image-processed image signal S400 and the point-of-occurrence-of-anomaly image signal S500 are input to the image selection section 104.

On the basis of information represented by the anomaly information output signal S200, the image selection section 104 selects one image signal from among the two image signals S400 and S500 that have been input from the image processing section 103, outputting the thus-selected signal (a selected image signal S900). Specifically, when the anomaly information output signal S200 represents occurrence of an anomaly in the main processing section 101, the image selection section 104 selects the point-of-occurrence-of-anomaly S500. On the contrary, when the anomaly information output signal S200 represents that the main processing section 101 is normally operating, the image selection section 104 selects the image-processed image signal S400. The selected image signal S900 is input to the display section 105. The display section 105 displays an image conforming to the selected image signal S900. In this regard, the image that corresponds to the selected image signal S900 when the point-of-occurrence-of-anomaly image signal S500 is selected is a white image, a black image or an image that shows an alarm display, or an image showing that the image processing apparatus is malfunctioning.

As above, in the embodiment, when the main processing section 101 is normally operating, the image processing section 103 outputs in parallel the image signal S400 that is obtained as a result of image processing being performed when the main processing section 101 is normally operating and the image signal S500 that is displayed when an anomaly has occurred in the main processing section 101. In accordance with the anomaly information output signal S200, the image selection section 104 selects either the image signal S400 or the image signal S500. Thus, when occurrence of an anomaly in the main processing section 101 is detected, the display section 105 immediately displays an image representing occurrence of an anomaly.

Second Embodiment

Figure 2:
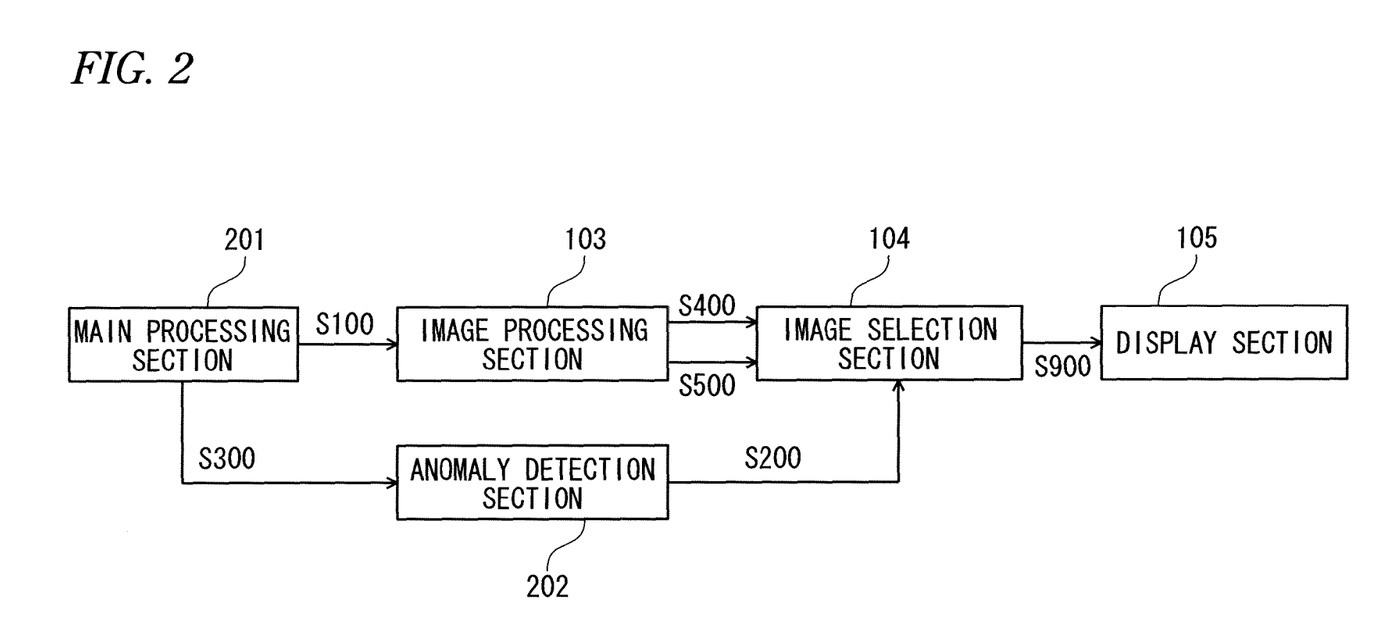
FIG. 2 is a block diagram showing an image processing apparatus of a second embodiment.

FIG. 2 is a block diagram showing an image processing apparatus of a second embodiment. As shown in FIG. 2, the image processing apparatus of the second embodiment is essentially analogous to its counterpart image processing apparatus of the first embodiment in terms of a configuration. However, the image processing apparatus of the second embodiment has a main processing section 201 in lieu of the main processing section 101 and an anomaly detection section 202 in lieu of the anomaly detection section 102. In FIG. 2, the constituent elements that are identical with or equivalent to the constituent elements of the image processing apparatus of the first embodiment are assigned the same or like reference numerals, thereby simplifying or omitting their explanations.

The main processing section 201 outputs a watchdog signal S300 and the image processing command signal S100. The watchdog signal S300 is one which represents an operating status of the main processing section 201. The main processing section 201 periodically outputs the watchdog signal S300. In the embodiment, the watchdog signal S300 is input to the anomaly detection section 202, and the image processing command S100 is input to the image processing section 103.

The anomaly detection section 202 detects occurrence of faulty operation of the main processing section 201 on the basis of information represented by the watchdog signal S300. As in the case of the anomaly detection section 102 of the first embodiment, the anomaly detection section 202 outputs the anomaly information output signal S200 which represents whether or not the main processing section 201 is anomalous. The anomaly information output signal S200 is input to the image selection section 104.

As above, in the embodiment, when the main processing section 201 has malfunction, the anomaly detection section 202 detects the malfunction of the main processing section 201 on the basis of the information represented by the watchdog signal S300. As in the first embodiment, the image-processed image signal S400 is one which is acquired as a result of image processing being performed in response to the image processing command signal S100 regardless of whether or not the main processing section 201 is anomalous. In the meantime, the point-of-occurrence-of-anomaly image signal S500 is also one which is acquired as a result of image processing being performed independently of the image processing command signal S100 and regardless of whether or not the main processing section is anomalous. Specifically, the image signals S400 and S500 are independent of each other. Therefore, when malfunction of the main processing section 201 is detected, the display section 105 immediately displays an image that shows occurrence of malfunction.

Therefore, when the image processing apparatus is mounted on the vehicle, the driver can be immediately notified of a failure of the main processing section 201. Therefore, the driver can prevent occurrence of an accident, so long as the driver temporarily parks his/her vehicle at a safe location.

Figure 3:
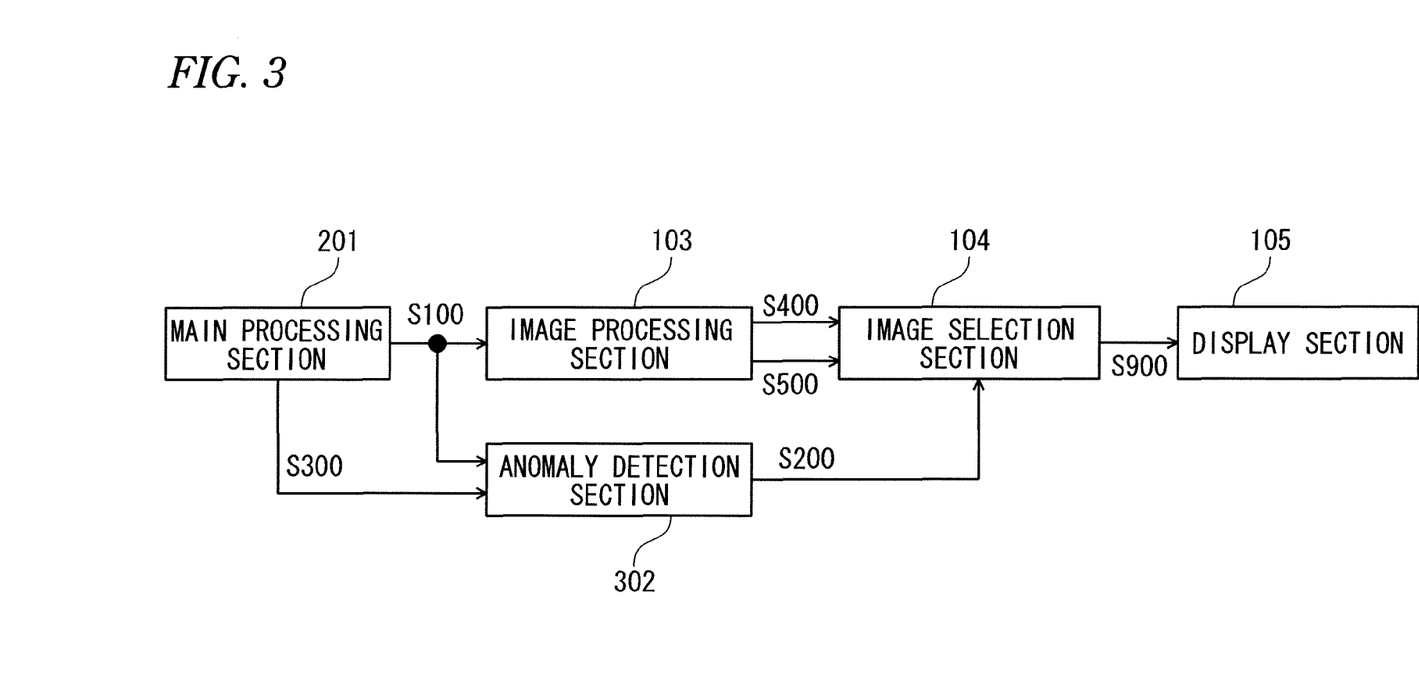
FIG. 3 is a block diagram showing an image processing apparatus of another embodiment.

Incidentally, as shown in FIG. 3, the image processing command signal S100 can be input not only to the image processing section 103 but also to the anomaly detection section 302. Further, the anomaly detection section 302 can also detect an anomaly in the main processing section 201 on the basis of the image processing command signal S100 and the watchdog signal S300.

Third Embodiment

Figure 4:
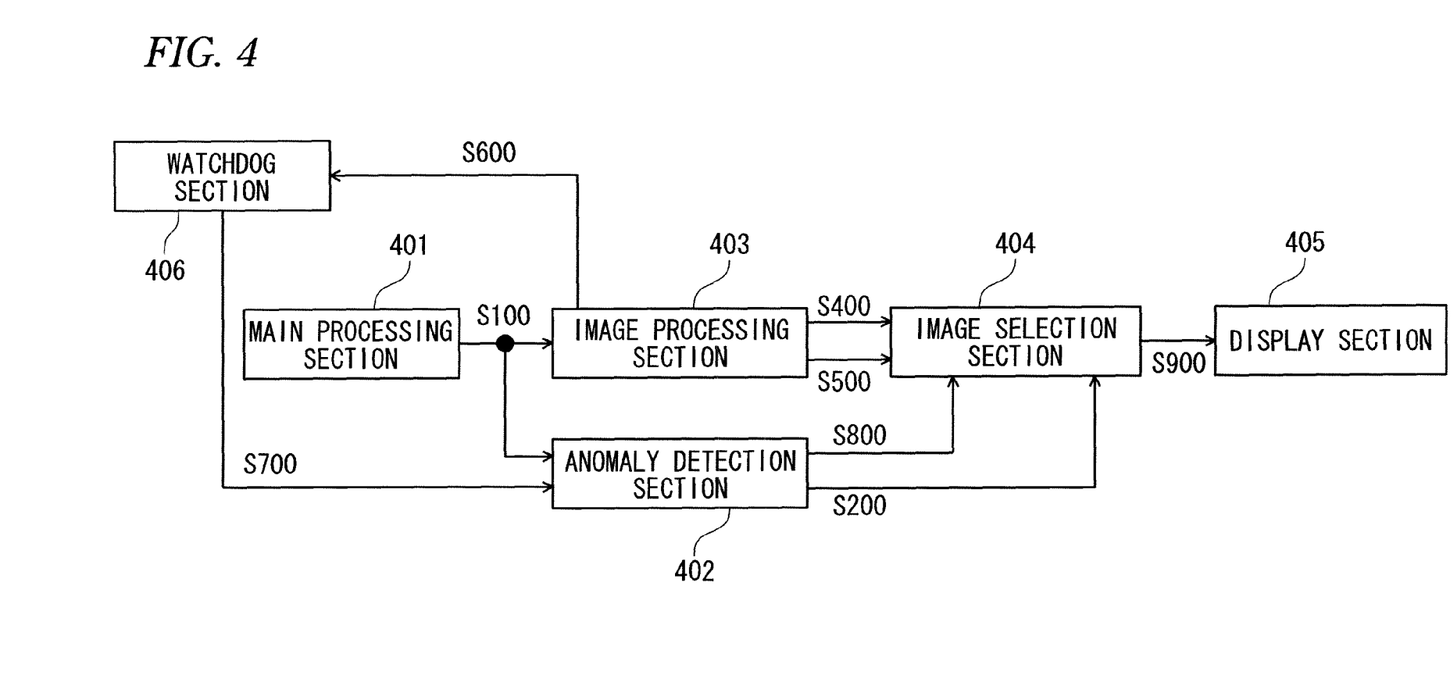
FIG. 4 is a block diagram showing an image processing apparatus of a third embodiment.

FIG. 4 is a block diagram showing an image processing apparatus of a third embodiment. As shown in FIG. 4, an image processing apparatus of the third embodiment has a main processing section 401, an image processing section 403, a watchdog section 406, an anomaly detection section 402, an image selection section 404, and a display section 405.

The main processing section 401 outputs the image processing command signal S100. The image processing command signal S100 is a control signal for the image processing section 403 and input to the anomaly detection section 402 and the image processing section 403.

The image processing section 403 performs image processing conforming to the image processing command signal S100, outputting in parallel the image-processed image signal S400 and the point-of-occurrence-of-anomaly image signal S500 regardless of whether or not the main processing section 401 is anomalous. The image-processed image signal S400 is one which is acquired as a result of image processing being performed in accordance with the image processing command signal S100 regardless of whether or not the main processing section 101 is anomalous. In the meantime, the point-of-occurrence-of-anomaly image signal S500 is also one which is acquired as a result of image processing being performed independently of the image processing command signal S100 and regardless of whether or not the main processing section is anomalous. To be specific, the image signals S400 and S500 are independent of each other. The image-processed image signal S400 and the point-of-occurrence-of-anomaly image signal S500 are input to the image selection section 104. Furthermore, when in normal operation, the image processing section 403 periodically outputs a monitor input signal S600. The monitor input signal S600 is input to the watchdog section 406.

The watchdog section 406 determines occurrence of an anomaly in the image processing section 403 on the basis of whether or not the monitor input signal S600 output from the image processing section 403 is input. Specifically, when the monitor input signal S600 is not input for a predetermined period or longer, the watchdog section 406 determines that an anomaly has occurred in the image processing section 403, outputting an image processing section anomaly information output signal S700. The image processing section anomaly information output signal S700 is input to the anomaly detection section 402.

The anomaly detection section 402 detects an anomaly in the main processing section 401 on the basis of the image processing command signal S100 output from the main processing section 401. The anomaly detection section 402 outputs the anomaly information output signal S200 that represents whether or not the main processing section 401 is anomalous. The anomaly information output signal S200 is input to the image selection section 404. The anomaly detection section 402 also detects an anomaly in the image processing section 403 on the basis of the image processing section anomaly information output signal S700 output from the watchdog section 406. Upon detection of the anomaly in the image processing section 403, the anomaly detection section 402 sends an alarm image signal S800 to the image selection section 404.

On the basis of information represented by the anomaly information output signal S200, the image selection section 404 selects one image signal (a selected image signal S900) from among the two image signals S400 and S500 that have been input from the image processing section 403, outputting the thus-selected signal (the selected image signal S900). Specifically, when the anomaly information output signal S200 represents occurrence of an anomaly in the main processing section 101, the image selection section 104 selects the point-of-occurrence-of-anomaly S500. On the contrary, when the anomaly information output signal S200 represents that the main processing section 101 is in normal operation, the image selection section 104 selects the image-processed image signal S400. The selected image signal S900 is input to the display section 405. If the alarm image signal S800 has been input, the image selection section 404 outputs the alarm image signal S800 as the selected image signal S900. The display section 405 displays an image conforming to the selected image signal S900.

As mentioned above, in the embodiment, the switching of an image takes place in response to occurrence of an anomaly in the main processing section 401. In addition, even when an anomaly has occurred in the image processing section 403, an image showing occurrence of an anomaly is immediately displayed on the display section 105. The method for detecting occurrence of an anomaly in the main processing section 401 described in connection with this embodiment is an application of the first embodiment, but the second embodiment can also be applied to this embodiment.

Each of the pieces of image processing apparatus described in connection with the first through third embodiments can also be provided with memory which stores the image processing command signal S100 and the anomaly information output signal S200 in an associated manner. Since memory records behaviors of the main processing sections 101, 201, and 401 that take place concomitantly with occurrence of an anomaly, analysis of the behaviors becomes possible. Further, in the third embodiment, the image processing section anomaly information output signal S700 and the alarm image signal S800 can also be recorded in the memory in an associated manner. Since memory records a behavior of the image processing section 403 that takes place concomitantly with occurrence of an anomaly, analysis of the behavior becomes possible. Incidentally, the memory is memory, such as LSI external memory, LSI internal memory, main processing section internal memory, image processing section internal memory, anomaly detection internal memory, image selection section internal memory, display section internal memory, and a watchdog section internal memory.

Each of the pieces of image processing apparatus described in connection with the first through third embodiments can also be provided with a sound processing section and a speaker that perform processing so as to generate a predetermined sound when occurrence of an anomaly in the main processing sections 101, 201, and 401 or the image processing section 403 is detected. As a result, the driver can ascertain occurrence of the anomaly by means of sounds as well as by means of an image.

Fourth Embodiment

Figure 5:
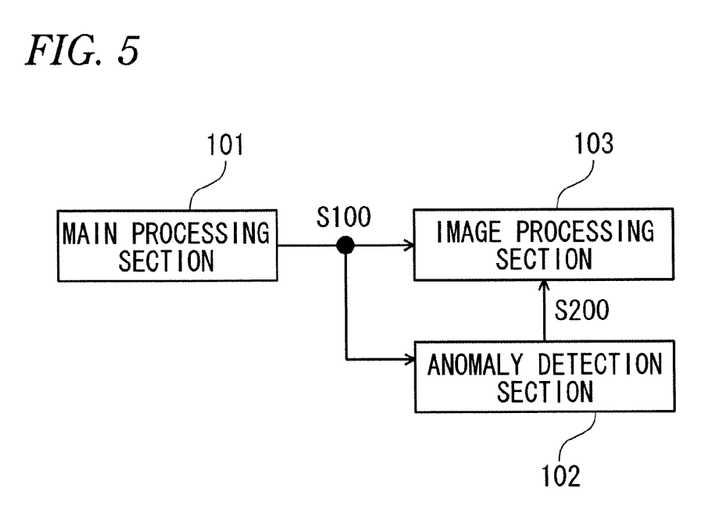
FIG. 5 is a block diagram showing an image processing apparatus of a fourth embodiment.

FIG. 5 is a system configuration diagram showing a countermeasure of the first embodiment to a safety enhancement image processing system.

An image processing apparatus of the embodiment comprises a main processing section 101 that outputs an image processing command signal S100;

an anomaly detection section 102 that detects an anomaly in the main processing section 101 on the basis of the image processing command signal S100; and an image processing section 103 that takes as input signals the anomaly information output signal S200 which transmits occurrence/nonoccurrence of an anomaly in the main processing section 101 from the anomaly detection section 102 as well as the image processing command signal S100 when the anomaly detection section 102 has not detected an anomaly and that performs image processing on the basis of the two input signals, and that takes as input signals the anomaly information output signal S200 as well as the image processing command signal S100 when the anomaly detection section 102 has detected an anomaly and that performs independent image processing on the basis of information about the two input signals.

Specifically, image processing and an output signal that are performed and produced when an anomaly is not detected are independent of image processing and an output signal that are performed and produced when an anomaly is detected.

When the main processing section 101 has malfunctioned, the image processing command signal S100 transmits the malfunction to the anomaly detection section 102. As a consequence, the image processing command signal S100 commands the image processing section 103 to perform malfunction signal processing. Pursuant to the command, the image processing section 103 can notify the driver that the main processing section 101 is malfunctioning.

Fifth Embodiment

Figure 6:
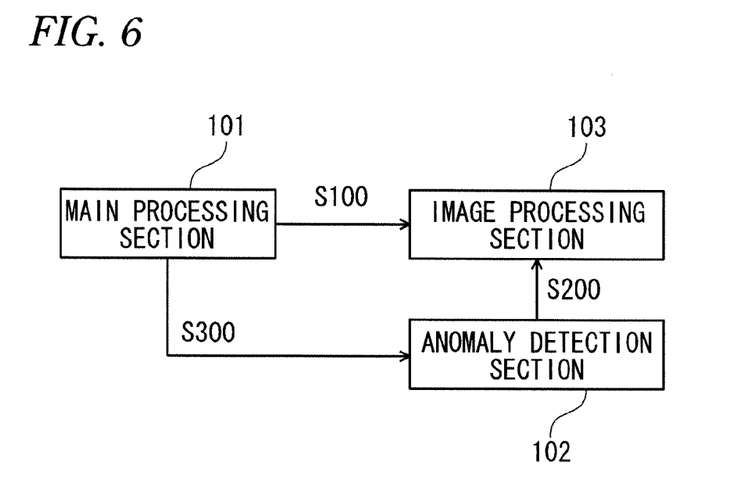
FIG. 6 is a block diagram showing an image processing apparatus of a fifth embodiment.

FIG. 6 is a system configuration diagram showing a countermeasure of the second embodiment to the safety enhancement image processing system.

An image processing apparatus of the embodiment comprises the main processing section 101 that outputs a watchdog signal S300 and the image processing command signal S100;

the anomaly detection section 102 that detects an anomaly in the main processing section 101 on the basis of the watchdog signal S300; and the image processing section 103 that takes as input signals the anomaly information output signal S200 which transmits occurrence/nonoccurrence of an anomaly in the main processing section 101 from the anomaly detection section 102 as well as the image processing command signal S100 when the anomaly detection section 102 has not detected an anomaly and that performs image processing on the basis of the two input signals, and that takes as input signals the anomaly information output signal S200 as well as the image processing command signal S100 when the anomaly detection section 102 has detected an anomaly and that performs independent image processing on the basis of information about the two input signals.

Specifically, image processing and an output signal that are performed and produced when an anomaly is not detected are independent of image processing and an output signal that are performed and produced when an anomaly is detected.

When the main processing section 101 has malfunctioned, the watchdog signal S300 transmits the malfunction to the anomaly detection section 102. As a consequence, the watchdog signal S300 commands the image processing section 103 to perform malfunction signal processing. Pursuant to the command, the image processing section 103 can notify the driver that the main processing section 101 is malfunctioning.

Sixth Embodiment

Figure 7:
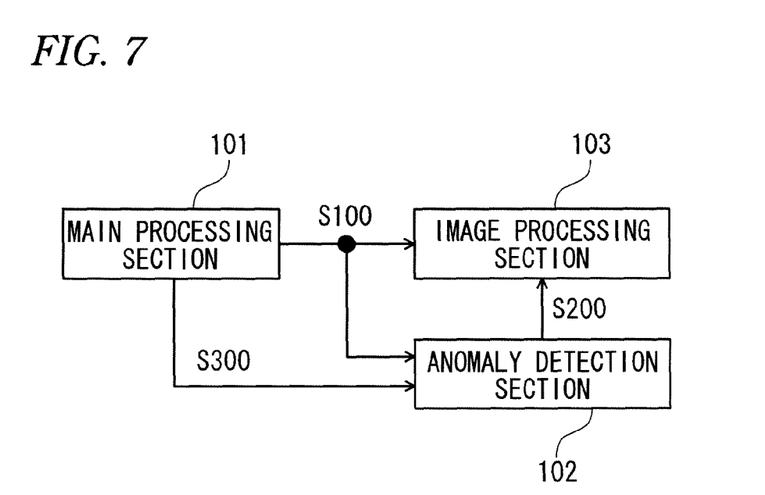
FIG. 7 is a block diagram showing an image processing apparatus of a sixth embodiment.

FIG. 7 is a system configuration diagram showing a countermeasure of the third embodiment to the safety enhancement image processing system.

An image processing apparatus of the embodiment comprises the main processing section 101 that takes as outputs the image processing command signal S100 and the watchdog signal S300;

the anomaly detection section 102 that detects an anomaly in the main processing section 101 on the basis of the image processing command signal S100 and the watchdog signal S300; and the image processing section 103 that takes as input signals the anomaly information output signal S200 which transmits occurrence/nonoccurrence of an anomaly in the main processing section 101 from the anomaly detection section 102 as well as the image processing command signal S100 when the anomaly detection section 102 has not detected an anomaly and that performs image processing on the basis of the two input signals, and that takes as input signals the anomaly information output signal S200 as well as the image processing command signal S100 when the anomaly detection section 102 has detected an anomaly and that performs independent image processing on the basis of information about the two input signals.

Specifically, image processing and an output signal that are performed and produced when an anomaly is not detected are independent of image processing and an output signal that are performed and produced when an anomaly is detected.

When the main processing section 101 has malfunctioned, the image processing command signal S100 and the watchdog signal S300 thereby transmit the malfunction to the anomaly detection section 102. As a consequence, the image processing command signal S100 and the watchdog signal S300 command the image processing section 103 to perform malfunction signal processing. Pursuant to the command, the image processing section 103 can notify the driver that the main processing section 101 is malfunctioning.

Each of the pieces of image processing apparatus described in connection with the fourth through sixth embodiments can also be provided with memory which stores the image processing command signal S100 and the anomaly information output signal S200 in an associated manner. Since memory records a behavior of the main processing section 101 that takes place concomitantly with occurrence of an anomaly, analysis of the behavior becomes possible. Incidentally, the memory is memory, such as LSI external memory, LSI internal memory, main processing section internal memory, image processing section internal memory, anomaly detection internal memory, image selection section internal memory, and display section internal memory.

Further, each of the pieces of image processing apparatus described in connection with the fourth through sixth embodiments can be provided with a sound processing section and a speaker that perform processing so as to generate a predetermined sound when occurrence of an anomaly in the main processing section 101 or the image processing section 103 is detected. As a result, the driver can ascertain occurrence of the anomaly by means of sounds as well as by means of an image.

The above-described first through third embodiments yield an advantage of the capability of notifying the driver of malfunction of the main processing section 101 in a shorter period of time than in the fourth to sixth embodiments.

Although the invention has been described in detail and by reference to the specific embodiments, it is manifest to those who are versed in the art that the invention be susceptible to various alterations and modifications without departing from the spirit and scope of the invention.

The patent application is based on Japanese Patent Application (JP-2011-172001) filed on Aug. 5, 2011, the subject matter of which is incorporated herein by reference in its entirety.

An image processing apparatus of the invention is useful as a processing apparatus, or the like, that, when an anomaly has occurred, immediately sends a notice to this effect.

What is claimed is:

1. An image processing apparatus comprising:
a main processing section configured to output an image processing command signal;
an anomaly detection section configured to detect an anomaly in the main processing section on the basis of the image processing command signal and output an anomaly information output signal which shows whether or not the main processing section is anomalous; and
an image processing section configured to
take the anomaly information output signal and the image processing command signal as input signals,
perform image processing on the basis of information of the image processing command signal when the anomaly information output signal represents that the anomaly detection section has not detected an anomaly, and
perform image processing independent of the image processing command signal when the anomaly information output signal represents that the anomaly detection section has detected an anomaly.

2. The image processing apparatus according to claim 1, further comprising memory configured to store the image processing command signal and the anomaly information output signal in an associated manner.

3. The image processing apparatus according to claim 1, further comprising a sound processing section configured to perform processing so as to output sounds conforming to the anomaly information output signal output from the anomaly detection section.

4. An image processing apparatus comprising:
a main processing section configured to output a watchdog signal and an image processing command signal;
an anomaly detection section configured to detect an anomaly in the main processing section on the basis of the watchdog signal, outputting an anomaly information output signal which shows whether or not the main processing section is anomalous; and an image processing section configured to
take the anomaly information output signal and the image processing command signal as input signals,
perform image processing on the basis of information of the image processing command signal when the anomaly information output signal represents that the anomaly detection section has not detected an anomaly, and
perform image processing independent of the image processing command signal when the anomaly information output signal represents that the anomaly detection section has detected an anomaly.

5. The image processing apparatus according to claim 4, wherein the anomaly detection section detects an anomaly in the main processing section on the basis of the watchdog signal and the image processing command signal.

6. An image processing apparatus comprising:
a main processing section configured to output an image processing command signal;
an anomaly detection section configured to detect an anomaly in the main processing section on the basis of the image processing command signal, outputting an anomaly information output signal which represents whether or not the main processing section is anomalous;
an image processing section configured to output in parallel a first image signal which is acquired by performing image processing on the basis of the image processing command and a second image signal independent of the image processing command signal; and
an image selection section configured to select, on the basis of information represented by the anomaly information output section, any one of the first image signal and the second image signal input from the image processing section, outputting the selected signal, wherein
the image selection section selects the first image signal when the anomaly information output signal shows that the anomaly detection section has not detected an anomaly and selects the second image signal when the anomaly information output signal shows that the anomaly detection section has detected an anomaly.

7. The image processing apparatus according to claim 6, wherein the image processing section periodically outputs a monitor input signal when in normal operation;
the image processing apparatus has a watchdog section configured to determine occurrence of an anomaly in the image processing section on the basis of whether or not the monitor input signal is input, outputting a signal showing a determination result;
the anomaly detection section detects an anomaly in the image processing section on the basis of a signal output from the watchdog section, outputting an alarm image signal;
and
the image selection section outputs the alarm image signal when the alarm image signal is input.

8. The image processing apparatus according to claim 7, further comprising memory configured to store a signal output from the watchdog section and the alarm image signal in an associated manner.

9. The image processing apparatus according to claim 6 wherein a displayed image provided by the second image signal is a white image, a black image, an image showing an alarm display, or an image showing malfunction of the image processing apparatus.

10. An image processing apparatus comprising:
a main processing section configured to output a watchdog signal showing an operating status and an image processing command signal;
an anomaly detection section configured to detect an anomaly in a main processing section on the basis of the watchdog signal, outputting an anomaly information output signal which shows whether or not the main processing section is anomalous;
an image processing section configured to output in parallel a first image signal which is acquired by performing image processing on the basis of the image processing command and a second image signal independent of the image processing command signal; and
an image selection section configured to select, on the basis of information represented by the anomaly information output section, any one of the first image signal and the second image signal input from the image processing section, outputting the selected signal, wherein
the image selection section selects the first image signal when the anomaly information output signal shows that the anomaly detection section has not detected an anomaly and selects the second image signal when the anomaly information output signal shows that the anomaly detection section has detected an anomaly.

11. The image processing apparatus according to claim 10, wherein the anomaly detection section detects an anomaly in the main processing section on the basis of the watchdog signal and the image processing command signal.

12. The image processing apparatus according to claim 5, wherein the image processing section periodically outputs a monitor input signal when in normal operation;
the image processing apparatus has a watchdog section configured to determine occurrence of an anomaly in the image processing section on the basis of whether or not the monitor input signal is input, outputting a signal showing a determination result;
the anomaly detection section detects an anomaly in the image processing section on the basis of a signal output from the watchdog section, outputting an alarm image signal;
and
the image selection section outputs the alarm image signal when the alarm image signal is input.

13. The image processing apparatus according to claim 10, wherein a displayed image provided by the second image signal is a white image, a black image, an image showing an alarm display, or an image showing malfunction of the image processing apparatus.

* * * * *